Sept. 10, 1940.     J. T. HAYWARD     2,214,674
METHOD OF LOGGING WELLS
Filed Jan. 29, 1938     2 Sheets-Sheet 1
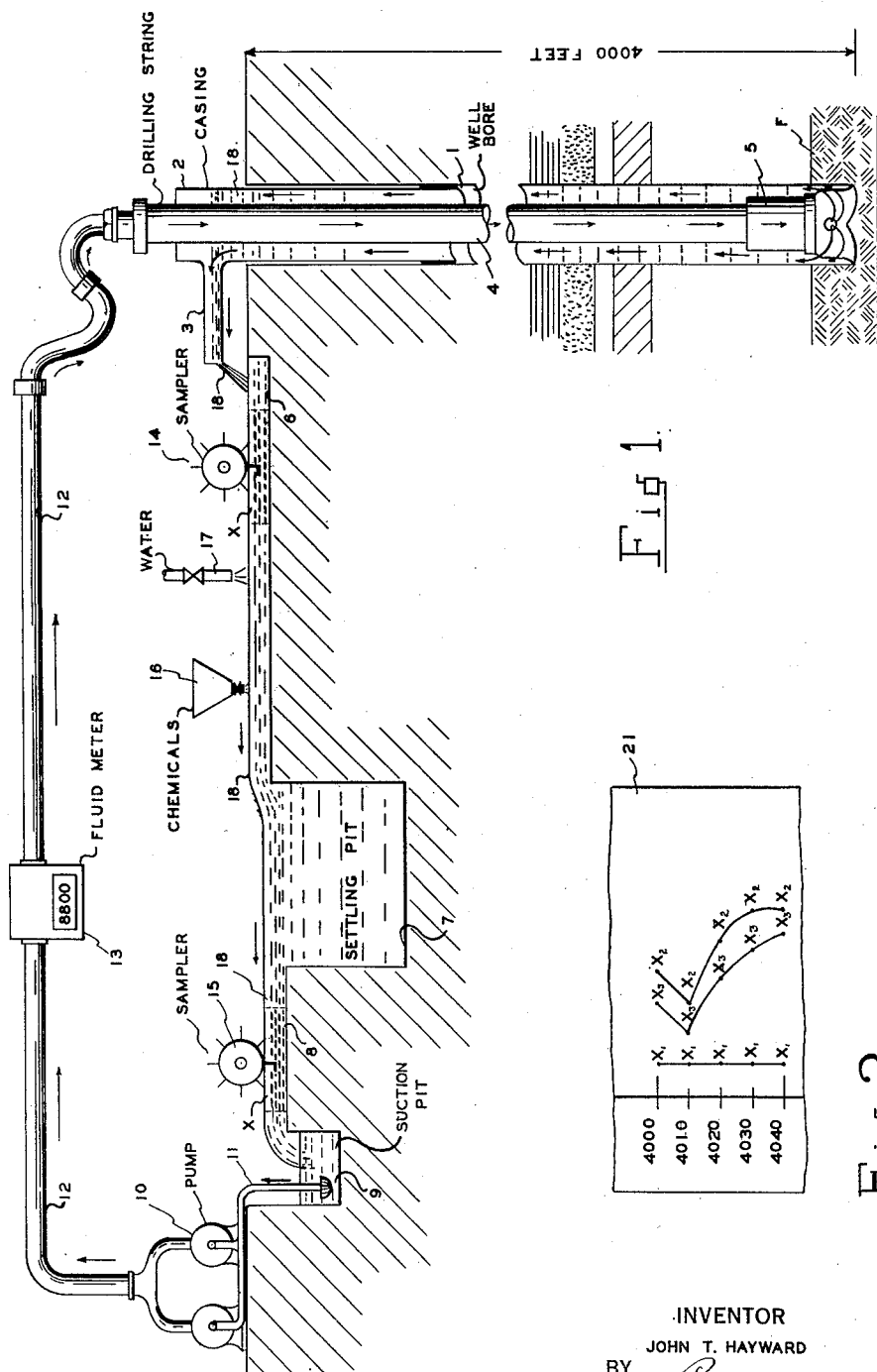
INVENTOR
JOHN T. HAYWARD
BY
ATTORNEY Patented Sept. 10, 1940

2,214,674

UNITED STATES PATENT OFFICE 2,214,674

METHOD OF LOGGING WELLS

John T. Hayward, Tulsa, Okla.

Application January 29, 1938, Serial No. 187,619

10 Claims. (Cl. 255—1)

This invention relates to a method of logging wells and particularly to a continuous method of logging wells during the drilling thereof.

Numerous methods have been devised, and certain of them utilized in practice, for logging strata lying beneath the surface of the earth, particularly for the purpose of ascertaining variations over a particular area in the position of the strata relative to some fixed base point, such as sea level, surface elevation or some specific stratum.

In most of these methods, the contour of the strata logged, is determined by observing certain properties, physical, chemical or the like, of the various strata forming the wall of a well bore, the differences in these properties from point to point along the well bore indicating different strata at these points. As different strata effect more or less characteristic changes in the particular test applied, comparison of these characteristic changes from well to well, relative to the depths at which these changes appear, provides a more or less empirical method of correlating the several wells and thus indicate the general contour of the logged strata.

The method most commonly used for logging strata is conventional coring by which a solid cylindrical core of the sub-surface strata is removed by means of a special core drilling tool attached to the drill pipe in place of the regular drill bit.

Another of the better known and more widely used logging tests, commonly referred to as the "Schlumberger Test," originally disclosed in U. S. Patent No. 1,819,923, utilizes the measurement of the electrical specific resistivity of the different strata traversed by a well bore. By logging a series of well bores in a particular area in this manner, where similar sequences of specific resistivity values appear in the several logs, it is assumed that the same series of strata are present in each of the wells. Then by correlating these series of strata, or individual ones of them, in relation to the depths at which their respective resistivity values appear in the several wells, the general contour of the strata in the particular area logged may be mapped with a fair degree of accuracy.

Other logging methods utilized test other than electrical specific resistivity of different strata, but in general, the procedure is similar to that of the Schlumberger method, in that different values of the particular tests, from point to point in a well bore, indicate different strata, and where the same or similar relative differences in values occurs in another well in the same area, it is assumed that the same strata are present in this well, though the particular depth relative to some base point may be different.

These various logging methods are subject to important disadvantages in their application, due to the fact that the testing of formations by these methods requires that apparatus necessary for making the tests be lowered into the well bore to points opposite or near the formations to be tested. To accomplish such testing, drilling must be stopped and the drilling string withdrawn from the well, to permit insertion therein of the testing apparatus. This procedure greatly delays drilling operations, is comparatively expensive, and where drilling is by methods utilizing a circulating hydraulic fluid for keeping the well open, stoppage of the drill may cause serious complications when resumption of drilling is attempted. For example, when conventional coring is employed, the regular drilling operation must be stopped, the circulation of drilling fluid being stopped also, and the drill stem withdrawn from the well in order to permit replacement of the ordinary drill bit by a special core bit or core barrel. The drill stem is then reinserted in the well and drilling continued with the core bit through a short interval, since the mechanical limitations of core drilling are such that only a comparatively few feet of core can be taken in one operation. The drill stem must then be again withdrawn from the well, the recovered section of solid core removed and the drill returned to the well for further coring. This operation must be repeated as often as necessary to obtain a core of the entire section of the well for which information is sought.

It has been discovered that when drilling wells by methods embodying this invention and employing a circulating hydraulic fluid, the wells may be logged without interrupting the drilling operation, and with a degree of accuracy fully as great as by the Schlumberger or other recognized methods, by suitable examination solely of the circulating hydraulic fluid.

The method of this invention, therefore, contemplates a well logging method, wherein a hydraulic fluid is circulated through a drilling well, and observing the changes in selected properties of the fluid, which occur when the fluid traverses the drilling zone.

Generally stated and in accordance with the illustrative embodiment of this invention, in the drilling of an oil or gas well by the employment of a circulating drilling fluid, successive portions of the core drilled from a stratum and their respective fluid contents (such as gas, oil or salt water) are dispersed in successive increments of the drilling fluid column rising in the well. Since, however, the fluid contents dispersed in the drilling fluid are those from the core or cylinder within the well bore, as distinguished from fluid flowing into the well from the strata surrounding the core, the dispersion of the fluid will be exceedingly dilute and can be observed and analyzed only by delicate instruments. In order to identify an increment, containing core fluid dispersed therein, at the top of the well as related to the depth of the stratum from which the core portion contained in that increment was taken, the depth of the stratum is measured in synchronism with the rise of that increment from that stratum. This can be accomplished even though the increment tested arrives at the top of the well after the depth of the drill may be greater than when that increment left or passed that stratum; for the increment tested is related to the depth of the drill when that increment left or passed that stratum. Accordingly the measurement of the depth of the stratum can be said to be in synchronism with the rise of the later analyzed increment from that stratum, even though there may be a time or a space relation between the two. An increment to be analyzed having reached the top of the well, an analysis of the fluid dilutedly dispersed therein can not only be accomplished by delicate instruments, but such analysis is related to the depth of the stratum from which the core tested was taken. In the case of the dispersion of salt water in an increment of the drilling fluid, electrical conductivity tests can be made to identify the presence of such salt water, even though dilute, for in accordance with the described embodiment of this invention, the comparison of the analysis of a selected increment before it enters the well and after it leaves the well, will show the presence of much salt water even though the conductivity of the drilling fluid may vary more than it is varied by the presence of dilute additions of salt water from the core.

In accordance with this invention, use is made of the fact that the flow of the hydraulic fluid through the well is in form of a closely restricted stream, the incoming fluid being confined within the bore of a drilling string, while the outgoing fluid is confined within the annular space between the wall of the well bore and the outside of the drilling string. In this restricted stream flow of the hydraulic fluid, it has been discovered that very little lineal mixing occurs in the stream. That is, while the drill string may be rotating at fairly high speed in contact with the fluid moving upwardly on the outside of the drilling string, very little mixing of lineally spaced increments of the fluid stream will occur. For example, if we assume a particular increment of the stream of fluid as being 10 feet in advance of another increment, these two increments will remain substantially the same distance apart throughout their flow from the entrance to the exit of the well. It is also found that the agitation of the drill bit, when fluid flows through the cutting or drilling zone, will act merely to agitate each increment as it flows past the bit but will not cause appreciable mixing of one increment with the next, or expressed differently, agitation of the stream of fluid will not be reflected through any appreciable length of the stream of fluid.

Since, therefore, the only changes in the character and composition of any increment of the fluid, are those which will occur in the immediate vicinity of the drill bit and are those produced by introduction into the fluid of the cuttings and fluids naturally contained therein, which are removed by the drill bit from the stratum being drilled at the moment the particular increment passes through the cutting zone, then, by comparing selected properties of the particular increment before and after it has traversed the drilling zone, the changes in these properties may be determined, and the subsurface stratum producing the changes identified thereby. In the case of gas and oil where the property or characteristic of the mud is initially known, an analysis of gas or oil may be made generally without comparing the increment leaving the well with that entering the well.

Since, as noted, each increment of the circulating fluid retains its substantial identity and its same relative position in the stream of fluid throughout its passage through the well, and since the size of the drill string and well bore are known, as well as the depth of the well at all times, the volume of fluid inside and outside the drilling string can be calculated readily. Knowing the area and the length of the restricted path of flow of the stream of fluid, the volume of fluid per unit length of the stream may be determined, and by measuring the volume of fluid flowing into or from the well, the position of each increment, at every point in its flow through the well, may be readily determined, and each increment may thus be traced from the time it enters the well until it leaves the well.

The correlation of an increment of fluid leaving a well with the depth of the well and also with the same increment entering the well, can be effected by measuring the volumetric flow of fluid through the well. The volumetric flow is measured directly, by suitable metering devices, and is measured without relation to any time element or rate of flow, and the relationship utilized, is one of units of volume of fluid relative to lineal footage of well depth. The depth of the well may be measured at any time at the top of the well, by a suitable depth measuring device. By way of example, let us assume that a well is drilling at a depth of 4000 feet, the diameter of the well bore is nine inches, the internal diameter of the hollow drill pipe is three inches and its external diameter three and one-half inches. The length of the drill pipe will be, of course, 4000 feet. The volume of fluid inside the drilling string from the top of the well to the drill bit at the bottom will be approximately 35 barrels, and the volume of fluid in the annular space between the drill pipe and the well bore will be approximately 265 barrels. From these figures, it will be seen that an increment of fluid entering the drill pipe must traverse a distance, represented by the flow of 35 barrels of fluid from the well, to reach the drill bit at the bottom of the well, and in flowing from the bottom of the well back to the top thereof, through the annular space between the drill pipe and the well bore, the increment must travel a distance measured by a flow of 265 additional barrels of fluid, or, each increment entering the well will re-emerge therefrom 300 barrels later. Thus, by testing the fluid entering the well, and after 300 barrels of fluid have thereafter flowed from the well, testing the emerging fluid, the tests thus obtained will represent the properties of substantially the same increment, and any changes in the outgoing fluid compared with the entering fluid, will be changes effected by material drilled from the formation encountered at the bottom of the well, and these changes are utilized for logging the formation encountered by the drill at 4000 feet.

It should be noted that great accuracy in measuring the circulating fluid is not necessary. Under average conditions, about 100 barrels of fluid are circulated per foot drilled, and in the 4000 foot well of the foregoing example, a plus or minus error of 10 percent in the measurement of the fluid would only mean an error of plus or minus four or five inches in logging the formation at 4000 feet. In practice, however, the accuracy of determining the well depth, at which gas, oil or salt water is encountered, is high by the method embodying this invention.

As the well becomes deeper, the volume of fluid in the circulating system in the well increases directly in proportion to the increase in the depth of the well, and the same proportionate increase applies both to the fluid inside the drilling string and that outside the drilling string. By applying the proper corresponding correction, in terms of barrels of fluid, to the spacing of the tests, the relative identity of the increments tested can be maintained.

Various tests suitable for well correlation purposes may be utilized to identify the formations or strata encountered. Since the method embodying the invention is, generally stated, a method of coring with, however, the core portions, as drilled, dilutedly dispersed in successive increments of the drilling fluid column, the tests applied to the increments may be those generally employed in testing the fluid contents of cores taken by conventional methods. Thus, a core taken by a conventional method has been crushed and tested for oil by leaching the crushed core with a suitable solvent such as ether, or by distillation, or by inspection under ultraviolet light. The test for salt water has been made by similarly crushing the core, leaching out the salt water with distilled water, and testing the resulting liquor for salt. The routine for testing for gas generally has been to mix gas with air to provide a combustible mixture which can then be tested for gas by the conventional hot wire filament method. This procedure for detecting gas has not, however, been successfully applied to core analysis due to the fact that the gas will have escaped from the core when it reaches the top of the well due to the reduction in pressure. Moreover, the test for salt water, above described, has not been successfully applied to cores taken by the conventional method owing to core contamination by the drilling fluid. Such tests will be discussed in somewhat greater detail hereinafter.

The various objects and advantages of this novel invention will be more readily understood from the following detailed description when read in conjunction with the accompanying drawings which illustrate, more or less diagrammatically, apparatus suitable for practicing the method of this invention. It will be understood, however, that this invention is not limited to any particular apparatus or even details of steps, but that various changes may be made in details but within the scope of the appended claims without departing from the spirit of this invention.

In the drawings:

Fig. 1 illustrates diagrammatically a more or less conventional system for circulating a hydraulic fluid through a well being drilled, as such system is modified for the practice of this invention.

Fig. 2 shows a well log resulting from the logging method in accordance with an illustrative embodiment of this invention.

Figure 3:
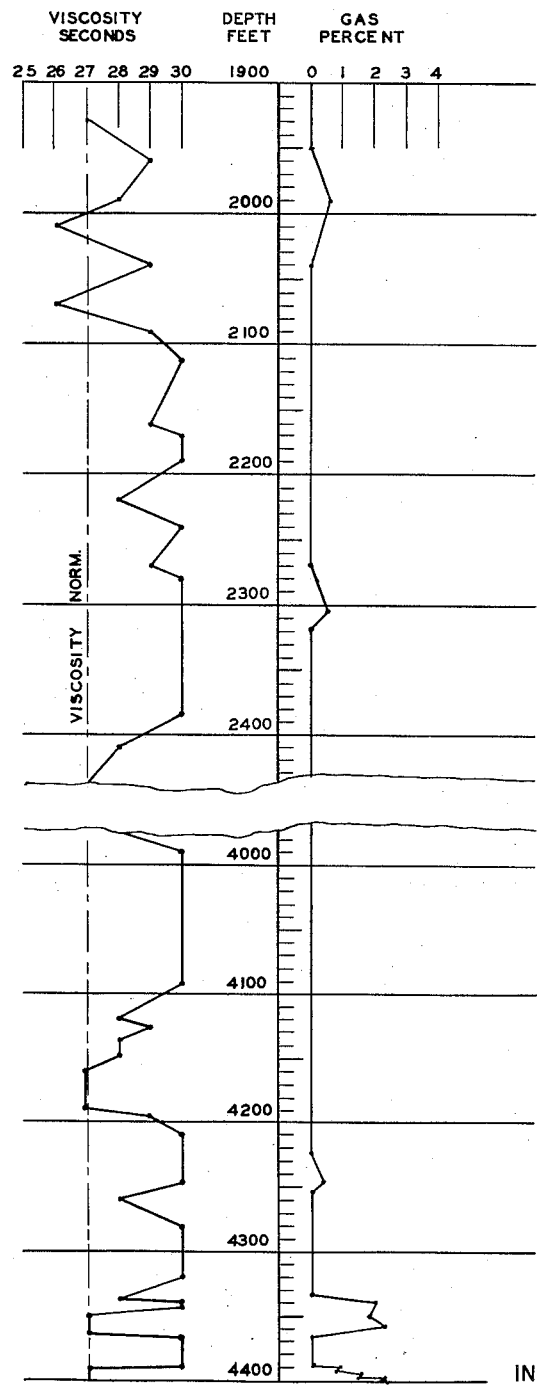
Fig. 3 is a section of a well log of a specific well logged by the method in accordance with an illustrative embodiment of this invention.

Referring to the drawings and Fig. 1 in particular, the numeral 1 designates a well bore drilled by conventional rotary methods, utilizing a circulating hydraulic fluid such as a suspension of clay in water and conventionally termed "rotary mud or drilling fluid or mud-laden fluid." The upper portion of well bore 1 is lined with casing 2 provided with a side outlet pipe 3. Extending into the well through well bore 1 is a conventional drilling string consisting of hollow drill pipe 4, to the lower end of which is connected a drill bit 5. Drill pipe 4 is suspended in the conventional manner from a traveling block, not shown, and is adapted to be rotated in the usual manner by conventional rotary apparatus, also not shown. Such a suspension is shown in applicant's Patent No. 2,166,212 granted July 18, 1939, which also discloses a suitable apparatus for measuring the well depth from the top of the well.

The mud circulating system comprises the usual mud ditch 6, settling pit 7, overflow ditch 8, pump suction pit 9, a mud pump 10 having a suction pipe 11 leading into suction pit 9 and having a mud discharge conduit 12 which communicates with the bore of the hollow drill pipe 4. A fluid meter 13 is positioned in conduit 12 and is adapted to measure the volumetric flow of the mud fluid flowing through conduit 12. Mud samplers 14 and 15 may be mounted in mud sampling relation to the fluids in mud ditch 6 and overflow ditch 8, respectively. It will be understood that various means for sampling the fluids may be used. A chemical hopper 16 and a water supply pipe 17, for supplying mud conditioning materials to the mud fluid, may be positioned between sampler 14 and settling pit 7. The mud fluid in circulation in the system is designated generally by the numeral 18.

For purposes of clarity in describing the logging method of this invention, utilizing the above described apparatus and mud fluid circulating system, the flow of a particular increment of the mud fluid will be traced through the system as applied to the example given above of a well drilling at 4000 feet and having a nine inch bore in which is inserted drill pipe having an internal bore three inches in diameter and an external diameter of three and one-half inches.

Assume an increment X of the mud fluid flowing from overflow ditch 8 into suction pit 9 and about to be drawn into suction pipe 11 for return to the well. Increment X will be sampled as it flows into suction pit 9 by means of sampler 15 and the sample so taken will be tested to determine the value of a selected property thereof before it enters the well, the property being selected for its value in comparison with that property in order to determine the nature of the stratum to be encountered by increment X when it reaches the drilling zone in the immediate vicinity of the drill bit 5. This value of the test of increment X before it enters the well will be designated $X_1$. Various tests, as noted above, may be applied to evaluate the particular property selected for logging purposes. As the sample of increment X is taken by sampler 15, the reading of fluid meter 13 is noted. Since sampler 15 is placed preferably immediately adjacent to the inlet of suction pipe 11, the sample taken thereby may be considered for all practical purposes, to be that of the increment entering the well, for the total volume of fluid in the system between suction pit 9 and the top of drill pipe 4 is relatively insignificant with respect to the total volume of mud fluid in the well proper.

Increment X will be drawn through suction pipe 11 into pump 10 and will be pumped thereby through pipe 12 into the top of drill pipe 4 and thence through the drill pipe and out through the usual openings in bit 5 into the drilling zone immediately surrounding the cutting edge of the bit. In the meantime, since the volumetric capacity of the drill pipe from the top of the well to the bottom thereof has been calculated to be approximately 35 barrels, this will mean, to the operator on the surface of the ground, that when fluid meter 13 records the flow of 35 barrels of fluid into the well, subsequent to the taking of the sample of increment X, increment X will have flowed down through drill pipe 4 and will be at the bottom of the well and in contact with the stratum being drilled.

At the moment the meter 13 records the passage of 35 barrels of fluid into the well, the operator records the depth of the well, which in this particular example will be 4000 feet. This well depth may be measured in any suitable and known manner. This depth figure may be placed on a suitable chart, such as chart 21 illustrated in Fig. 2, and opposite the depth of the well, the value $X_1$ will be placed. Increment X, which is now at the bottom of the well in the drilling zone surrounding bit 5, will pick up the cuttings being cut from a formation F by the bit, which will be dilutedly dispersed in the increment X of the fluid column, and value $X_1$ will be altered in accordance with the nature of formation F. Increment X will now flow upwardly through the annular space between well bore 1 and drill pipe 4 to the top of the well and will be discharged therefrom through outlet pipe 3 into mud ditch 6. The flow of the increment from the drilling zone to the top of the well will be traced by noting the passage of an additional 265 barrels of fluid through meter 13, this volume having been calculated previously to be the volumetric capacity of the annular space between the wall of well bore 1 and drill pipe 4. When, as noted, the meter 13 records the passage of the additional 265 barrels of fluid, increment X thereupon will be emerging from the well and will contain the cuttings of formation F and fluids contained therein picked up in the drilling zone. Thus, the depth of the well is measured in synchronism with the increment X leaving the bottom of the well. The emerging increment X will be sampled by means of sampler 14 and tested for its value of the selected property. The new value, designated $X_2$, will be marked on chart 21 opposite value $X_1$ and the corresponding depth reading. Any differences in the values $X_1$ and $X_2$ will be recorded as value $X_3$, which will also be placed opposite the depth reading. The chart will then show, opposite 4000 feet, the value $X_3$, which will represent the change in the selected test property due to the nature of formation F, encountered at 4000 feet.

Increment X, after flowing past sampler 14, will flow into settling pit 7, where cuttings which are insoluble and not remaining in suspension will be settled out and the increment returned to the suction of pump 10 for recirculation through the system.

As the fluid increment flows past sampler 14 through ditch 6 toward the settling pit, chemicals and water may be added from hopper 16 and pipe 17 to return the fluid to its original condition, if found necessary as a result of changes effected in the fluid in its flow through the drilling zone.

Utilizing the described method, a succession of increments of the mud fluid may be tested as drilling proceeds, and by plotting the values $X_3$ from point to point along the well bore, as shown in Fig. 2, changes in the formations traversed will appear on the charts at the depths at which these changes occur and the well will thus be logged.

For correlation of well logs, it is largely immaterial, though desirable in some cases, that the exact geological nature of the particular strata encountered be determined. The important thing is to show the occurrence of similar relative differences in the tests of the successive formations encountered in the several wells to be correlated. By finding a similar sequence of values $X_3$ in each of the wells, it may be assumed with substantial accuracy, that the same series of formations or strata are present in each well, and by noting the particular depth in each well at which these sequences appear, the contour of the strata logged by this method may be mapped.

As noted previously, tests of several different properties of the well fluid may be utilized for logging by the method of this invention. Some of the tests are such as to merely indicate a general difference in the nature of the strata traversed, such as whether the strata are shales or clays or are sands or rock formations. Other tests may be applied to identify strata more specifically, such as salt or salt water strata, gas or oil containing formations.

It should be understood that wherever the term "property of the mud fluid" is referred to hereafter, particularly in the claims, is meant any selected property, the changes in which serve as suitable index of the strata producing such changes in the mud fluid.

In the first mentioned class of tests may be listed viscosity, color, geological or physical examination of the cuttings separated from the mud fluid, and the like. In the second class of tests are tests showing relative salinity of the entering and emerging increments of the fluid to indicate when the formations traversed are salt beds or salt water containing formations, as compared with the over or under-lying strata which are non-saline; tests showing the presence of gas in the formation; and tests showing the presence of oil.

As an example in connection with the first class of tests, it has been found, starting with a mud fluid of a given viscosity, that the viscosity will increase sharply when the fluid encounters a clay or shaly formation, and that no increase, or even a slight decrease in viscosity of the fluid occurs when drilling through rock or sand formations. Thus a well logged by my method, using the comparative viscosity values of the incoming and emerging increments of the mud fluid, will show the depth positions of strata which are either shales or non-shaly formations. The particular method or apparatus for obtaining the viscosity measurements may be any suittable method such as that now in common use for measuring the viscosity of well muds.

As an example of the second class of tests, measurements may be made in a manner previously described, either by electrical or chemical means, of the comparative salinities of the entering and emerging increments of the mud fluid and the well logged in terms of saline and non-saline formations. The gas content of the entering and emerging increments may be compared by subjecting uniform sized samples of the increment to a vacuum and measuring the resulting increase in volume of the sample, and by charting the changes in gas content, the well may be logged in terms of gas-containing formations and nongas-containing formations. The test for gas, however, may be conducted in accordance with the well known method of gas analysis heretofore described. The presence of oil may be determined by centrifuging samples of the entering and emerging increments, an increase in the oil content of the emerging increment over that of the entering increment showing the presence of oil in the formation through which that increment passed. The test for oil, however, may be conducted in accordance with the method heretofore described.

The oil and gas content tests are particularly important, for in modern drilling practice, the head of the column of mud fluid in the well is ordinarily controlled to exceed the head of the formation being drilled; accordingly entrance of oil or gas into the well fluid from the formation surrounding the bore hole does not, therefore, ordinarily take place; in fact, the mud fluid will tend to seal off the formation as drilling proceeds. The very small quantity of oil or gas in the cylinder of formation cut out by the bit, will be so thoroughly intermingled with the mud fluid that its presence cannot ordinarily be detected and the drill may pass completely through the oil or gas containing formation and seal it off unknown to the driller at the surface of the ground. By my new logging method, which permits the making of a direct comparison of any increment of the fluid entering and leaving the well and of relating the changes in that increment to a particular formation, the presence of oil can be easily determined by simply centrifuging samples of the increments entering and leaving the well, or by any other suitable method as heretofore described, and this determination may be made within a comparatively short time after the increment has passed through the formation being drilled and before the drill can progress very far into the oil-containing formation. Similarly, by measuring specific volumes of samples of the fluid at reduced pressures, or by any other suitable method as heretofore described, the presence of gas in the fluid may be determined readily.

All of these various tests may be applied to the same samples and well logs obtained which will show depth positions of clays, rock, salt, gas and oil containing formations. In every case, however, an important feature of this invention resides in the method of logging sub-surface strata by means of the changes produced by the strata in a circulating well fluid, and in correlating the changes with the depth of the strata producing the changes. There may be however the additional steps of correlating each increment of fluid emerging from the well with the same increment entering the well by means of the volumetric flow of the fluid through the well.

The second class of tests, applied as they are to determining the depths of strata in which occur gas, oil or salt water, are important in the drilling of a well, particularly in a "wild cat" territory, for they give the driller almost immediate information as to the nature of the strata encountered during drilling. The presence of gas will be noted some time before a gas producing stratum is reached because of the seepage of the gas into the strata overlying the principal gas stratum. Moreover, an oil producing stratum generally contains gas so that advance information will be given here also. In the case of salt water, it is highly desirable that a casing be set to shut off the salt water stratum and its location in a given well is, therefore, essential. In fact, the method embodying this invention accomplishes, in addition to the results heretofore described, the result that by its employment, advance information is given of the proximity of oil and gas sands enabling proper completion methods to be undertaken.

By my new method, a very simple and inexpensive method of logging wells is provided, which eliminates expensive coring operations and which may be applied continuously while the well is drilling without in any way interrupting the drilling operations and whereby the well operator is quickly and continuously advised, throughout the drilling operations, of the nature of the formations encountered, and their depth.

Fig. 3 shows a log, obtained by the above described method, of a particular well drilled in the Texas Gulf Coast area. This well was drilled to 4399 feet and completed there as an oil producer. The well was logged from 1900 feet down to the bottom using viscosity and gas content of the mud fluid, as the particular logging tests. The viscosity curve is shown on the left hand side of the line of depth readings and represents valves $X_3$ in seconds, charted with reference to a norm line representing the viscosity of a normal mud fluid, which in this particular case was 27 seconds through a standard sized orifice. The gas content curve appears on the right hand side of the line of depth readings and represents values $X_3$ charted in terms of percent of gas in the mud fluid. The changes in the nature of the various strata encountered and the depths at which these changes appear are clearly apparent from the log.

Several other wells were drilled in this same locality, and as they were drilled, were logged in the manner just described, and the logs correlated with that of the first well charted in Fig. 3. From the correlations of the logs, it was possible to predict the depth at which oil would be found in each of the wells, and in every case, the oil producing formation was found exactly as predicted.

By thus eliminating the expensive coring operations required in conventional practice, great savings are effected. In the case of a well drilled in so-called "wild-cat" territory, where the nature of the sub-surface strata are to a great extent unknown, the well is ordinarily cored for a major portion of its entire depth. As noted, this is a very expensive operation and in the case of certain wells in Louisiana drilled to a depth of over 10,000 feet, the cost of drilling including coring in the conventional manner, was about $250,000.00. A well in the same area drilled to substantially the same depth, but logged by my new method, cost only about $75,000.00.

It will be apparent from the foregoing description, that my new method is, in effect, a continuous coring method, wherein the cored material comprises the cuttings removed from the traversed strata by the normal operation of the drill bit and dispersed thereby in the stream of circulating mud fluid in which the cored material is retained, as the stream of fluid flows from the well, in the same relative position in which it was dispersed therein by the bit, to thereby permit identification of each stratum by means of the changes produced in the mud fluid by the cuttings from that stratum.

What I claim and desire to secure by Letters Patent is:

1. The method of logging the strata of an oil or gas well while being drilled by the employment of a circulating fluid, comprising, causing successive portions of the core drilled from a stratum and the respective fluid contents of such core portions to become dilutedly dispersed in successive increments of the drilling fluid column rising in the well while the fluid column is maintained at a head exceeding the head of said stratum, measuring the depth of said stratum in synchronism with the rise of a selected increment from said stratum, identifying said increment at the top of the well as related to the depth of said stratum and making an analysis of said selected increment at the top of the well, in order to determine the character of the fluid contents of the core portion dispersed in said increment.

2. The method of logging the strata of an oil or gas well while being drilled by the employment of a circulating fluid, comprising, causing successive portions of the core drilled from a stratum and their respective fluid contents to become dispersed in successive increments of the drilling fluid column rising in the well, making an analysis of a selected increment before it enters the well, measuring the depth of said stratum in synchronism with the rise of said increment from said stratum in order to identify said increment at the top of the well and making an analysis of said selected increment at the top of the well, in order to determine the character of the fluid contents of the core portion dispersed in said increment.

3. The method of logging the strata of an oil or gas well while being drilled by the employment of a circulating fluid, comprising, causing successive portions of the core drilled from a stratum and the respective fluid contents of such portions to become dilutedly dispersed in successive increments of the drilling fluid column rising in the well while the fluid column is maintained at a head exceeding the head of the stratum, measuring the depth of said stratum in synchronism with the rise of a selected increment from said stratum by the volumetric flow of the drilling fluid, identifying said increment at the top of the well as related to the depth of said stratum and making an analysis of said selected increment at the top of the well, in order to determine the character of the fluid contents of the core portion dispersed in said increment.

4. The method of logging the strata of an oil or gas well while being drilled by the employment of a circulating fluid, comprising, causing successive portions of the core drilled from a stratum and their respective fluid contents to become dispersed in successive increments of the drilling fluid column rising in the well, making an analysis of a selected increment before it enters the well, measuring the depth of said stratum in synchronism with the rise of the selected increment from said stratum by the volumetric flow of the drilling fluid in order to identify said increment at the top of the well and making an analysis of said selected increment at the top of the well, in order to determine the character of the fluid contents of the core portion dispersed in said increment.

5. The method of logging the strata of an oil or gas well while being drilled by the employment of a circulating fluid, comprising, causing successive portions of the core drilled from a stratum and any gas contained in such core portions to become dispersed dilutedly in successive increments of the drilling fluid column rising in the well while the fluid column is maintained at a head exceeding the head of said stratum, measuring the depth of said stratum in synchronism with the rise of a selected increment from said stratum, identifying said increment at the top of the well as related to the measured depth of said stratum, and making an analysis of said selected increment at the top of the well, in order to determine the presence of gas in the core portion dispersed in said increment.

6. The method of logging the strata of an oil or gas well while being drilled by the employment of a circulating fluid, comprising, causing successive portions of the core drilled from a stratum and any oil contained in such core portions to become dilutedly dispersed in successive increments of the drilling fluid column rising in the well while the fluid column is maintained at a head exceeding the head of said stratum, measuring the depth of said stratum in synchronism with the rise of a selected increment from said stratum, identifying said increment at the top of the well as related to the measured depth of said stratum and making an analysis of said selected increment at the top of the well, in order to determine the presence of oil in the core portion dispersed in said increment.

7. The method of logging the strata of an oil or gas well while being drilled by the employment of a circulating fluid, comprising, causing successive portions of the core drilled from a stratum and any salt contained in such core portions to become dilutedly dispersed in successive increments of the drilling fluid column rising in the well, making an analysis of a selected increment before it enters the well, measuring the depth of said stratum in synchronism with the rise of the selected increment from said stratum in order to identify said increment at the top of the well and making an analysis of said selected increment at the top of the well, in order to determine the presence of salt in the core portion dispersed in said increment.

8. The method of logging the strata of an oil or gas well while being drilled by the employment of a circulating drilling fluid, comprising, causing successive portions of the core drilled from a stratum and their respective fluid contents to become dilutedly dispersed in successive increments of the drilling fluid column rising in the well, making an analysis of a selected increment before it enters the well, measuring the depth of said stratum in synchronism with the rise of said increment from said stratum in order to identify said increment at the top of the well and making an analysis of said selected increment at the top of the well to thereby determine the nature of said stratum.

9. The method of logging the strata of an oil or gas well while being drilled by the employment of a circulating mud-laden fluid, comprising, causing successive portions of the core drilled from a stratum to become dispersed in successive increments of the fluid column rising in a well, making an analysis of a selected increment before it enters the well, measuring the depth of said stratum in synchronism with the rise of said increment from said stratum in order to identify said increment at the top of the well and making an analysis of said selected increment at the top of the well to thereby determine the nature of said stratum.

10. The method of mapping the strata of oil or gas wells in a territory comprising, drilling each of a series of such wells in said territory by the employment of a circulating drilling fluid column maintained at a head exceeding the head of the stratum being drilled, causing successive portions of the core and their respective fluid contents drilled from a stratum in each such well to become dilutedly dispersed in successive increments of the drilling fluid column rising in such well, measuring the depth of each such stratum in synchronism with the rise of a selected increment from each such stratum, identifying such increment at the top of each such well as related to the depth of said stratum, making an analysis of each such selected increment at the top of its respective well in order to determine the character of the fluid contents of the core portion dilutedly dispersed in each such selected increment to thereby determine the nature of each such stratum, and correlating the depths and the corresponding strata of the several wells.

JOHN T. HAYWARD.